United States Patent [19]

Yamada

[11] Patent Number: 5,089,841
[45] Date of Patent: Feb. 18, 1992

[54] DEVICE FOR AUTOMATICALLY CHANGING MAGNIFICATION OF CAMERA ZOOM LENS

[75] Inventor: Masatoshi Yamada, Nagano, Japan

[73] Assignee: Chinon Kabushiki Kaisha, Nagano, Japan

[21] Appl. No.: 584,753

[22] Filed: Sep. 19, 1990

[30] Foreign Application Priority Data

Oct. 18, 1989 [JP] Japan ................. 1-271327

[51] Int. Cl.⁵ .......................................... G03B 13/36
[52] U.S. Cl. ................... 354/402; 354/195.1; 354/195.12; 354/442
[58] Field of Search ............ 354/402, 403, 195.1, 354/195.12, 442, 443

[56] References Cited

U.S. PATENT DOCUMENTS

| | | | |
|---|---|---|---|
| 4,354,748 | 10/1982 | Grimes et al. | 354/442 |
| 4,437,744 | 3/1984 | Terui et al. | 354/442 |
| 4,545,665 | 10/1985 | Aihara | 354/402 |
| 4,593,987 | 6/1986 | Takahashi et al. | 354/402 |
| 4,878,080 | 10/1989 | Takehana et al. | |
| 4,951,082 | 8/1990 | Takagi | 354/443 |

Primary Examiner—Russell E. Adams

[57] ABSTRACT

A camera automatic zoom lens adjustment apparatus in which photography can be performed in one of three modes including a standard mode, creative mode, and active mode. For the creative mode, aperture values of the camera are set at values greater than that for the standard mode to permit improved photography of scenery, which scenery may also include a subject of photography. For the active mode, shutter speeds are set to values faster than that for the standard mode to permit improved photography of sport scenes, or the like. Three points are designated on the subject of photography and the distance each point is away from the camera is measured so that the closest point may be determined as well as the size of the subject within the depth of the field. The proper zoom ratio, or focal distance, is determined with respect to the desired photography mode, the size of the subject in the corresponding depth of field, and the distance the closest point is away from the camera.

22 Claims, 2 Drawing Sheets

DEVICE FOR AUTOMATICALLY CHANGING MAGNIFICATION OF CAMERA ZOOM LENS

BACKGROUND OF THE INVENTION

1. Field of the Invention

This invention relates to a camera zoom lens automatic magnification changing device for automatically adjusting the focal distance of a zoom lens in accordance with the distance of the subject, the size of the subject within the angle of view, etc., such a device being adapted for use in a still camera, a movie camera or the like.

2. Background Art

Conventionally, as disclosed in Japanese Laid-Open (Kokai) Patent Application No. 232315/89, there has been proposed a device in which the distance of the subject at each of at least three points of the subject within the angle of photographing view is measured to judge the size of the subject within the angle of photographing view, and in accordance with the distance of the subject, the size and position of the subject, the magnification of the lens is changed to the optimum zoom ratio. In such a device, even if the size of the subject differs, the size of the subject within the angle of view can be kept constant to a certain degree, and even if the subject is positioned out of the center of the angle of view, the distance can be accurately measured. Thus, such a device has a feature that the magnification-changing control, etc., are not affected.

However, when actually photographing, there are also many factors other than the size of the subject, and it is desirable that in view of such factors, the lens be changed in magnification to obtain an optimum condition. For example, when photographing outdoor scenery, or a person with scenery used as a background, it is preferred that the zoom ratio be set to the wide-angle side from the original zoom ratio determined by the distance of the subject and the size of the subject. In contrast, when photographing a sport scene, it is preferred that the zoom ratio be set to the telephotographic side from the original zoom ratio.

Thus, despite the size and the position of the subject, the required zoom ratio varies in accordance with the photographing situation. Therefore, if, in accordance with the photographing conditions, a more proper magnification-changing program is automatically selected, advantageous control of photography is achieved.

SUMMARY OF THE INVENTION

It is an object of this invention, to provide a camera zoom lens automatic magnification changing device which changes the zoom lens to an optimum zoom ratio in dependence not only on the size and position of the subject within the angle of photographing view, but also dependent on whether scenery or a moving subject is photographed.

According to a first embodiment of the present invention, there is provided a device for automatically changing the magnification of a zoom lens of a camera wherein the focal distance of the zoom lens is automatically changed in accordance with the subject, the device including an exposure program switching device for switching an exposure program between a standard program and a creative program in which the value of an aperture is set greater than that set in the standard program, the exposure program determining the aperture value and a shutter speed in a prescribed relation in accordance with the brightness of external light;

a zoom lens drive device for changing the focal distance of the zoom lens;

a distance measuring device for measuring a distance of the subject at each of at least three points disposed respectively at a central portion, a right side portion, and a left side portion of the subject within an angle of photographing view;

a controller for controlling the zoom lens drive device in accordance with an output of the distance measuring device;

the controller including a first data table in which a plurality of programs for determining the focal distance of the zoom lens in accordance with the distance of the subject are set in accordance with the size of the subject within the angle of photographing view, and a second data table in which based on the programs set in the first data table, the focal distances of the programs are set toward a wide-angle side;

a focal distance determining and program selecting device for imputting a switching condition of the exposure program switching device, and for selecting the first data table when the selected exposure program is the standard program, and for selecting the second data table when the selected exposure program is the creative program;

a judging device for judging the closest distance and the point of this closest distance from the distances of the points measured by the distance measuring device, and for judging in accordance with the focal distance of the lens corresponding to the closest distance and a depth of field at this focal distance whether or not the measured distances of the other points are present within the field of depth;

a determining device for determining a zoom ratio in accordance with the program of a selected one of the data tables, based on the closest distance and the size of the subject; and an output device for driving the zoom lens drive device in accordance with the determining means.

According to a second embodiment of the present invention, there is provided a device for automatically changing the magnification of a zoom lens of a camera wherein the focal distance of the zoom lens is automatically changed in accordance with the subject, the device including an exposure program switching device for switching an exposure program between a standard program and an active program in which a shutter speed is set higher than that set in the standard program, said exposure program determining the value of an aperture and the shutter speed in a prescribed relation in accordance with the brightness of external light;

a zoom lens drive device for changing the focal distance of the zoom lens;

a distance measuring device for measuring a distance of the subject at each of at least three points disposed respectively at a central portion, a right side portion, and a left side portion of the subject within an angle of photographing view;

a controller for controlling the zoom lens drive device in accordance with an output of the distance measuring device;

the controller including a first data table in which a plurality of programs for determining the focal distance of the zoom lens in accordance with the distance of the subject are set in accordance with the size of the subject within the angle of photographing view, and a third data table in which based on the programs set in the first data table, the focal distances of the programs are set toward a telephotographic side;

a focal distance determining and program selecting device for inputting a switching condition of the exposure program switching device, and for selecting the first data table when the selected exposure program is the standard program, and for selecting the third data table when the selected exposure program is the active program;

a judging device for judging the closest distance and the point of this closest distance from the distances of the points measured by the distance measuring device, and for judging in accordance with the focal distance of the lens corresponding to the closest distance and a depth of field at this focal distance whether or not the measured distances of the other points are present within the field of depth;

a determining device for determining a zoom ratio in accordance with the program of a selected one of the data tables, based on the closest distance and the size of the subject; and an output device for driving the zoom lens drive device in accordance with the determining means.

According to the first embodiment, the distance of the subject at each of at least three points disposed respectively at the central portion, the right side portion and the left side portion of the subject within the angle of photographing view is measured. Then, it is judged which point is the closest distance, and in accordance with the focal distance of the lens corresponding to this closest distance and the depth of field at this focal distance, the size of the subject is judged by judging whether or not the measured distances of the other points are within this depth of field. Based on this result, the zoom ratio is determined according to the predetermined magnification-changing program. Here, as the magnification-changing programs for determining the zoom ratio, a standard program and a program suited for the photographing of scenery or the like are set respectively in the first and second data tables. Depending on whether the standard program or the creative program is selected as the exposure program, a corresponding one of the first and a second data tables is selected, and the zoom ratio is determined according to the magnification-changing program suited to the photographing situation. Namely, the optimum zoom ratio is obtained in accordance with the size of the subject within the angle of photographing view and other factors such as the possibility of photographing scenery.

According to the second embodiment, the distance of the subject at each of at least three points disposed respectively at the central portion, the right side portion and the left side portion of the subject within the angle of photographing view is measured. Then, it is judged which point is the closest distance, and in accordance with the focal distance of the lens corresponding to this closest distance and the depth of field at this focal distance, the size of the subject is judged by judging whether or not the measured distances of the other points are within this depth of field. Based on this result, the zoom ratio is determined according to the predetermined magnification-changing program. Here, as the magnification-changing programs for determining the zoom ratio, a standard program and a program suited for the photographing of a moving subject are set respectively in the first and third data tables. Depending on whether the standard program or the active program is selected as the exposure program, a corresponding one of the first and third data tables is selected, and the zoom ratio is determined according to the magnification-changing program suited to the photographing situation. Namely, the optimum zoom ratio is obtained in accordance with the size of the subject within the angle of photographing view and other factors such as the possibility of photographing a moving subject.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED
EMBODIMENT OF THE INVENTION

One preferred embodiment of the invention will now be described with reference to the drawings.

Figure 1:
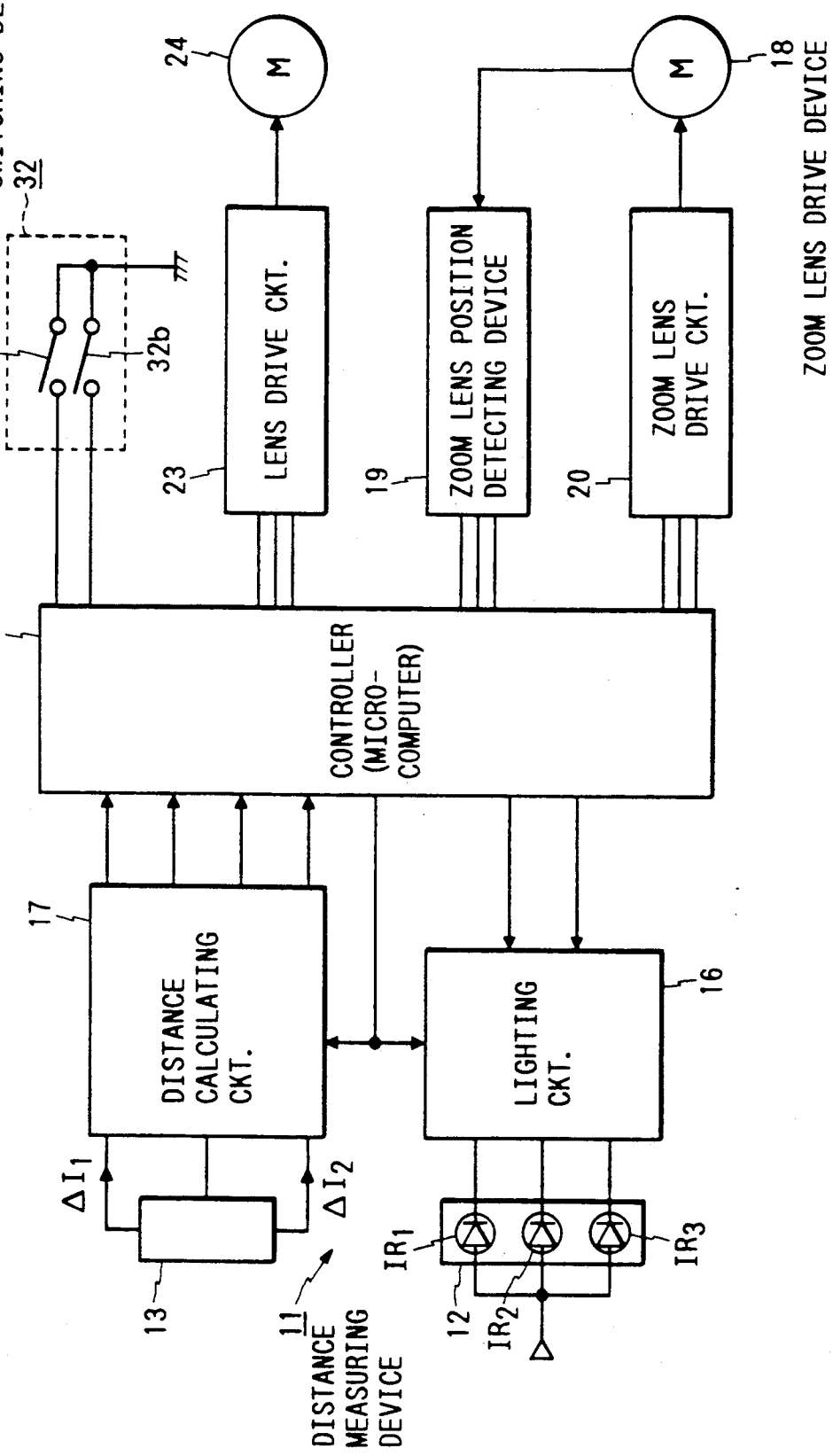
FIG. 1 is a block diagram of a camera zoom lens magnification-changing device in accordance with an embodiment of the present invention.

In FIG. 1, a distance measuring device 11 comprises IR-LED array 12 having a plurality of infrared emitting elements (hereafter referred to as "light-emitting element") IR1, IR2 and IR3, and a one-dimensional semiconductor position detecting element (hereinafter referred to as "PSD") 13 upon which infrared rays, which have been sequentially applied from the light-emitting elements IR1 IR2 and IR3 to a subject (not shown) and have been reflected by them, are incident. In accordance with the incident position, the PSD 13 produces distance signals $\Delta I1$ and $\Delta I2$ representative of the distances of the subject.

The light-emitting elements IR1, IR2 and IR3 are so arranged that the distances of, respectively, at least three points on the subject (i.e., the central portion, the right side portion and the left side portion within the angle of photographing view) can be measured.

In accordance with instructions from a microcomputer (controller) 15, the light-emitting elements IR1 Ir2 and Ir3 are sequentially controlled to be lit via a lighting circuit 16.

The distance signals $\Delta I1$, $\Delta I2$ from the PSD 13 are fed to a distance calculating circuit 17 where these signals are converted into measured-distance information (m-bit digital signals) with respect to each of the above points. This information is inputted into the microcomputer 15.

The microcomputer 15 controls the timing of operating of each circuit, and also stores, in the form of an m-bit digital signal, the measured-distance information with respect to each of the above points, fed from the distance calculating circuit 17. The microcomputer 15 serves as means for judging from this measured distance information (that is the timings of lighting of the light-emitting elements IR1 IR2 and IR3) which of the three points has given the closest distance information. The microcomputer 15 also has a means for judging the closest distance and its point from the measured distance of each of the above points, measured by distance measuring device 11, and for determining the size of the subject, in accordance with the focal distance of the lens corresponding to this closest distance and the depth of field at this focal distance, by judging whether or not the measured distance of any other point exists within this depth of field. The microcomputer 15 also serves as a determining means for determining a zoom ratio according to a zoom ratio-changing program (later described), based on the above closest distance and the size of the subject, and also serves as an output means for driving a zoom motor in accordance with this determining means.

Then, a zoom drive amount is determined in accordance with the determined zoom ratio and the present zoom position inputted from a zoom lens position detector (encoder) 19, and this is fed to a zoom lens drive circuit 20 to drive the zoom motor (zoom lens drive device) 18, thereby changing the zoom ratio of the zoom lens to the above determined zoom ratio.

At the same time, a control instruction based on the above closest distance information is fed to a lens drive circuit 23 to focus the lens with respect to the closest distance.

Figure 2:
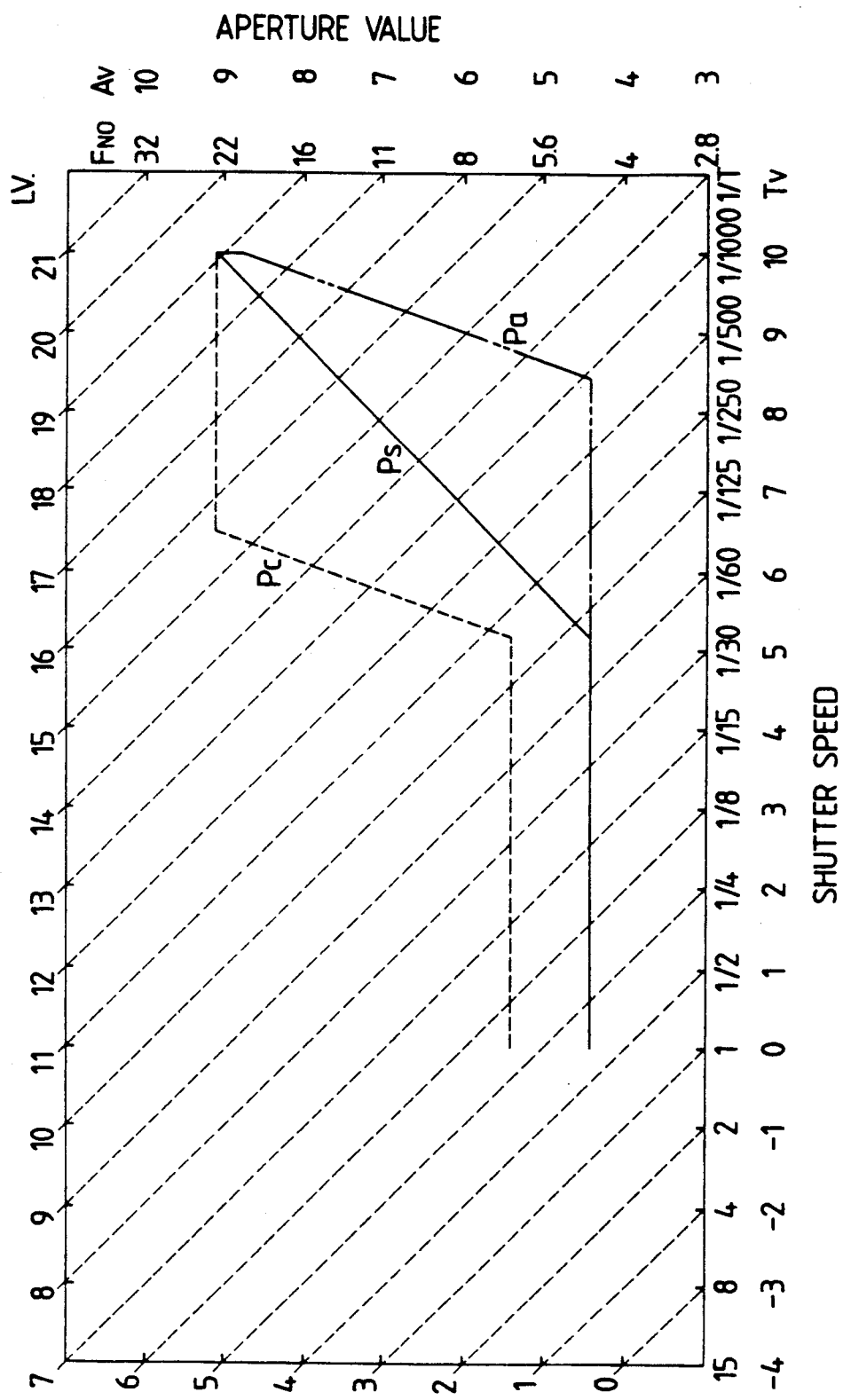
FIG. 2 is an illustration showing an exposure program.

An exposure program switching device 32 has two switches 32a and 32b. The exposure program is so determined that the shutter speed and the aperture value are in a prescribed relation in accordance with variations in the brightness LV of external light, as shown in a solid line in FIG. 2. Recently, there have been many cameras which, in order to meet the photographing situation, have, in addition to the above standard programs Ps indicated in the solid line, a creative program Pc in which in order to cover the scenery or both the scenery and a person, the aperture value is made greater than the standard program to increase the depth of field, and also an active program Pa in which in order to photograph a moving subject, the shutter speed is made higher than the standard program to catch a moment of the motion.

The present invention is directed to a camera provided with such devices, and the exposure program is selectively switched among these exposure programs by the exposure program switching device 32. In the illustrated example, when both of the switches 32a and 32b are in the OFF state, the standard program Ps is selected, and when the switches 32a and 32b are in the OFF and ON states, respectively, the active program Pa is selected.

Since the exposure program is thus selected according to the photographing situation, the photographing situation in which the camera is presently disposed ca be designated by inputting the switching condition of the exposure program switching device 32.

The present invention is intended to operate in accordance with such designated photographing situation, and to determine the optimum zoom ratio in view of not only the distance of the subject and the size thereof, but also the corresponding photographing situation.

To achieve this, the microcomputer 15 includes a first data table (for the standard program Ps) in which a plurality of magnification-changing programs for determining the focal distance of the zoom lens are set in accordance with the distance of the subject are set in accordance with the size of the subject within the angle of photographing view; a second data table (for the creative program) in which in accordance with the above programs set in the first data table, the focal distances of these programs are set to the wide-angle side; and a third data table (for the active program) in which the above programs are set to the telephotographic side. Further, the microcomputer has a program selecting means for determining the focal distance, which means inputs thereinto the switching condition of the above exposure program switching device, and selects the first data table when the selected exposure program is the standard program, selects the second data table when the selected exposure program is the creative program, and selects the third data table when the selected exposure program is the active program.

Here, the distance measuring device 11 measures the distances with respect to the three points, by means of the three light-emitting elements IR1 IR2 and IR3 and the PSD 13.

In this optical system, the three light-emitting elements IR1, IR2 and IR3 are arranged in a row perpendicularly intersecting the base line of the distance measuring optical system. For effecting the distance measurement, these light-emitting elements are sequentially lit, and a beam of light emitted therefrom is applied to the subject via a project lens 9. A beam reflected by the subject is incident on the PSD 13 via a receptor lens 8. The PSD 13 is capable of detecting the incident position only in the direction of the length L of the base line, and does not detect the incident position in a direction perpendicular to the base line length L. Namely, the PSD detects only the incident position, corresponding to the distance up to the subject, in the direction of the base line length L. Therefore, from such incident position, the distance up to the subject with respect to each of the points can be measured through the light emitted from each of the light-emitting elements IR1, IR2 and IR3.

Next, a method of determining the zoom ratio in accordance with the measured distance of the subject with respect to each of the points is considered. Table 1 shows the first data table (for the standard program) in which the magnification-changing programs are set for determining the zoom ratio for a 35 mm-camera with a zoom lens of 35 to 70 mm.

TABLE 1

| SET distance (mm) | AF Step | FOCAL DISTANCE (mm) | | | | | | | |
|---|---|---|---|---|---|---|---|---|---|
| | | 35.00 | 38.78 | 44.03 | 49.28 | 54.53 | 59.78 | 65.03 | 70.00 |
| 1.000 | 1 | Prog3 | | Prog2 | | | Prog1 | | |
| 1.058 | 2 | | 3 | 2 | | | 1 | | |
| 1.123 | 3 | | 3 | 2 | | | 1 | | |
| 1.198 | 4 | | 3 | 2 | | | 1 | | |

TABLE 1-continued

| SET distance (mm) | AF Step | FOCAL DISTANCE (mm) | | | | | | | |
|---|---|---|---|---|---|---|---|---|---|
| | | 35.00 | 38.78 | 44.03 | 49.28 | 54.53 | 59.78 | 65.03 | 70.00 |
| 1.284 | 5  | 3 |   | 2 |   |   | 1 |   |   |
| 1.385 | 6  | 3 |   | 2 |   | 1 |   |   |   |
| 1.505 | 7  | 3 |   | 2 |   |   | 1 |   |   |
| 1.649 | 8  | 3 |   | 2 |   |   | 1 |   |   |
| 1.825 | 9  | 3 |   | 2 |   |   | 1 |   |   |
| 2.046 | 10 |   | 3 | 2 |   |   | 1 |   |   |
| 2.332 | 11 |   |   | 3 | 2 |   | 1 |   |   |
| 2.714 | 12 |   |   |   | 3 | 2 | 1 |   |   |
| 3.253 | 13 |   |   |   |   | 3 | 2 | 1 |   |
| 4.070 | 14 |   |   |   |   |   | 3 | 2 | 1 |
| 5.454 | 15 |   |   |   |   |   |   | 3 | 2 |
| 8.309 | 16 |   |   |   |   |   |   |   | 3 |

In Table 1, SET distance (m) is plotted at equal field-of-depth distance intervals. AF step is distance information corresponding to the above SET distance, and is a lens-setting signal. The remaining columns represent the focal distance (mm).

Here, the measuring distance information of the central point is represented by N2, the measuring distance information of the right side point is represented by N1 and the measuring distance information of the left side point is represented by N3. The amount of the depth of the field of the lens with respect to the measured distance of the closest one of these points is represented by $\alpha$.

In Table 1, three programs (Prog1, Prog2 and Prog3) are set for the distance information (AF step). Prog3 represents the case where the focal distance (zoom ratio) of the lens set only by the distance information is applied. Prog2 and Prog1 are used when, in addition to the distance information, the size of the subject within the angle of photographing view, etc., are judged from the depth of the field of the lens, etc., as later described, whereby the zoom ratio of the lens is increased to the telephotographic side. Incidentally, when the distance information is great, which represents almost infinite distance, the zoom ratio set only by the distance information increases, so that Prog3 and Prog2 indicate the same focal distance, or Prog3, Prog2 and Prog1 all indicate the same focal distance.

Reference is now made to the case where photographing is made with the SET distance of 1.825 mm (AF step 9).

It is firstly assumed that this distance information, that is, the closest distance information, is obtained from one side portion (right side or left side portion) within the angle of photographing view. It is judged whether or not the distance information representing the distance of the subject lo at the other side portion is within the depth of field of the lens of the focal distance corresponding to the above closest distance information. If the result is "YES", it is judged that the subject can be in focus over the entire screen. Namely, it is judged that the size of the subject within the angle of photographing view is large. In this case, the above Prog3 is applied, and the increase of the zoom ratio to the telephotographic side is not effected. This is expressed as follows:

In the case of $|N1-N3| \leq \alpha$, there are established $N1 \leq N2+\alpha1$, and $N3 \leq N2+\alpha3$ (Prog3).

Next, it is assumed that one side portion corresponds to the closest distance information of 1.825 mm, and the distance information of the other side portion is not within the depth of field of the lens of the focal distance corresponding to this closest distance information. In this case, there is some room within the angle of photographing view, and the above Prog2 is applied, so that the focal distance (zoom ratio) is increased from 35.00 mm to 44.03 mm, that is, toward the telephotographic side. This is expressed as follows:

In the case of $|N1-N3| > \alpha$, there is established $N1 \leq N2+\alpha1$, or $N3 \leq N2+\alpha3$ (Prog2).

Next, it is assumed that the closest distance information of 1.825 m is obtained from the central point, and the distance information of both side portions are not within the depth of field of the lens when photographing at 1.825 m. In this case, it is judged that the size of the subject within the angle of photographing view is small, and Prog1 is applied. Therefore, the focal distance (zoom ratio) is further increased to 59.78 mm toward the telephotographic side. This is expressed as follows:

$N2 < N1 - \alpha2$, and $N2 < N3 - \alpha2$ (Prog1).

Next, it is assumed that the closest distance information of 1.825 m is obtained from the central point, and the distance information of one side portion is within the depth of field of the lens, with the other not being within it, when photographing at 1.825 m. In this case, Prog2 is applied.

$N2 \geq N1 - \alpha2$ and $N2 < N3 - \alpha2$, or $N2 \geq N3 - \alpha2$ and $N2 < N1 - \alpha2$ (Prog2)

The above-mentioned $\alpha$ is a step number (integer) which will not cause a forward out-of-focus photography when photographing the subject, for example, at the position of $N2+\alpha2$, even if $\alpha$ is added to N2.

The above steps 1, 2 and 3 of the depth of the field are all comprised of two steps from Table 1. Namely, the zoom ratio is programmed to be increased when the distance step exceeds 10 in Prog3, and when the distance step exceeds 12 in Prog2, and when the distance step exceeds 15 in Prog3.

This 3-point distance information is the zoom information ($2^3=8$) as the arrangement information of the subject (or the size information of the subject).

The above-mentioned method of determining the zoom ratio is to determine the zoom ratio in accordance with the distance of the subject and the size of the subject within the angle of photographing view, and can determine the proper zoom ratio in an ordinary photographing condition. Therefore, when the standard program Ps has been selected by the exposure program switching device 32, the zoom ratio can be determined using the above first data table. Namely, using the program selecting means for determining the focal distance, which means is provided by the microcomputer 15, the first data base (Table 1) is selected in accordance with the switching condition signal from the exposure program switching device 32, and the distance of the subject and the size of the subject are applied to the data of this first data base, and the zoom ratio is determined according to the corresponding program (one of Prog1, Prog2 and Prog3).

On the other hand, when the creative program Pc has been selected by the exposure program switching device 32, the photographer intends to photograph scenery or scenery with a person therein, and it is preferred that the zoom ratio be shifted toward the wide-angle side from the standard program. Therefore, using the second data table (Table 2) in which each of Prog1, Prog2 and Prog3 is set toward the wide-angle side as compared to the first data table, the zoom ratio can be determined.

A comparison is now made between the first data table (Table 1) and second data table (Table 2). In the first data table (for the standard program Ps), the focal distance of the zoom lens at a SET distance of 2.714 m is 59.78 mm at Prog1, and 49.28 mm at Prog2 and Prog3. In the second data table (for the creative program Pc), this focal distance is 59.78 mm at Prog1 as in the first data table, but is 44.03 mm at Prog2 and 38.78 mm at Prog3, that is, is set toward the wide-angle side. Therefore, in the case of scenery or the like, photography can be performed over a wide range with the zoom ratio set toward the wide-angle side, thus achieving the photography intended by the photographer.

When the active program Pa has been selected by the exposure program switching device 32, the photographer intends to photograph a moving subject, and it is preferred that the zoom ratio be shifted from the standard program toward the telephotographic side in order to photograph the subject on a larger scale. Therefore, using a third data table (Table 3) in which each of Prog1, Prog2 and Prog3 is set toward the tele-

TABLE 2

| SET distance (m) | AF Step | FOCAL DISTANCE (mm) | | | | | | | |
|---|---|---|---|---|---|---|---|---|---|
| | | 35.00 | 38.78 | 44.03 | 49.28 | 54.53 | 59.78 | 65.03 | 70.00 |
| 1.000 | 1 | Prog3 | | Prog2 | | | Prog1 | | |
| 1.058 | 2 | 3 | | 2 | | | 1 | | |
| 1.123 | 3 | 3 | | 2 | | | 1 | | |
| 1.198 | 4 | 3 | | 2 | | | 1 | | |
| 1.284 | 5 | 3 | | 2 | | | 1 | | |
| 1.385 | 6 | 3 | | 2 | | 1 | | | |
| 1.505 | 7 | 3 | | 2 | | 1 | | | |
| 1.649 | 8 | 3 | | 2 | | 1 | | | |
| 1.825 | 9 | 3 | | 2 | | 1 | | | |
| 2.046 | 10 | 3 | | 2 | | 1 | | | |
| 2.332 | 11 | 3 | | 2 | | 1 | | | |
| 2.714 | 12 | | 3 | 2 | | 1 | | | |
| 3.253 | 13 | | | 3 2 | | 1 | | | |
| 4.070 | 14 | | | 3 | 2 | 1 | | | |
| 5.454 | 15 | | | 3 2 1 | | | | | |
| 8.309 | 16 | | 3 2 1 | | | | | | |

Namely, using the program selecting means for determining the focal distance, the second data table (Table 2) is selected in accordance with the switching condition signal from the exposure program switching device 32, and the distance of the subject and the size of the subject are applied to the data of the second data table, and the zoom ratio is determined according to the corresponding program (one of Prog1, Prog2 and Prog3).

photographic side as compared to the first data table, the zoom ratio can be determined.

TABLE 3

| SET distance (m) | AF Step | FOCAL DISTANCE (mm) | | | | | | | |
|---|---|---|---|---|---|---|---|---|---|
| | | 35.00 | 38.78 | 44.03 | 49.28 | 54.53 | 59.78 | 65.03 | 70.00 |
| 1.000 | 1 | Prog3 | | Prog2 | | | Prog1 | | |
| 1.058 | 2 | 3 | | 2 | | | 1 | | |
| 1.123 | 3 | 3 | | 2 | | | 1 | | |
| 1.198 | 4 | 3 | | 2 | | | 1 | | |
| 1.284 | 5 | 3 | | 2 | | | 1 | | |
| 1.385 | 6 | 3 | | 2 | | | 1 | | |
| 1.505 | 7 | 3 | | 2 | | | 1 | | |
| 1.649 | 8 | | 3 | 2 | | | 1 | | |
| 1.825 | 9 | | | 3 2 | | | 1 | | |
| 2.046 | 10 | | | | 3 2 | | 1 | | |
| 2.332 | 11 | | | | | 3 2 | 1 | | |
| 2.714 | 12 | | | | | | 3 2 1 | | |
| 3.253 | 13 | | | | | | | 3 2 1 | |
| 4.070 | 14 | | | | | | | | 3 2 1 |
| 5.454 | 15 | | | | | | | | 3 2 1 |
| 8.309 | 16 | | | | | | | | 3 2 1 |

Namely, using the program selecting means for determining the focal distance, the third data table (Table 3) is selected in accordance with the switching condition signal from the exposure program switching device 32, and the distance of the subject and the size of the subject are applied to the data of the third data table, and the zoom ratio is determined according to the corresponding program (one of Prog1, Prog2 and Prog3).

A comparison is now made between the first data table (Table 1) and the third data table (Table 3). In the first data table (for the standard program Ps), the focal distance of the zoom lens at a SET distance of 2.714 m as described above is 59.78 mm only at Prog1. On the other hand, in the third data table (for the creative program Pc), this focal distance is 59.78 mm at all of Prog1, Prog2 and Prog3, that is, is set toward the telephotographic side from the standard program. Therefore, when photographing an athletic event or the like, the subject can be photographed on a large scale with the zoom ratio set toward the telephotographic side, thus achieving the photography intended by the photographer.

The exposure program switching device 32 used in the present invention is provided for selecting the program of the shutter exposure of the camera and does not require the use of a large number of additional elements. Therefore, the requirement of minimal additional elements results in a cost-effective device which is of improved performance.

As described above, according to a first embodiment of the invention, the zoom ratio is determined not only by the distance of the subject and the size of the subject, but also by judging whether or not the photographer intends to photograph scenery or the like. Therefore, the proper zoom ratio suited to the needs of the photographer can always be obtained.

According to a second embodiment of the invention, the zoom ratio is determined not only by the distance of the subject and the size of the subject, but also by judging whether or not the photographer intends to photograph a moving subject. Therefore, similarly, the proper zoom ratio can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for automatically changing a magnification of a zoom lens of a camera wherein a focal distance of the zoom lens is automatically changed in accordance with a subject of photography, comprising:

exposure program switching means for switching an exposure program between a standard program and a creative program in which a value of an aperture is set greater than that set in said standard program, said exposure program determining said aperture value and a shutter speed in a prescribed relation in accordance with a brightness of external light;

zoom lens drive means for changing the focal distance of the zoom lens;

distance measuring means for measuring a distance of the subject at each of at least three points disposed respectively at a central portion, a right side portion, and a left side portion of the subject within an angle of photographing view; and a controller for controlling said zoom lens drive means in accordance with an output of said distance measuring means, said controller consisting of a first data table in which a plurality of programs for determining the focal distance of the zoom lens in accordance with distance of the subject are set in accordance with a size of the subject within said angle of photographing view, and a second data table in which based on said plurality of programs set in said first data table, focal distances of said programs are set toward a wide-angle side, focal distance determining and program selecting means for receiving a signal indicative of a switching condition of said exposure program switching means and for selecting said first date table when a selected exposure program is said standard program and for selecting said second data table when said selected exposure program is said creative program, means for judging which of said measured distances is shortest and for determining the corresponding point and measured distance from the distance of said points measured by said distance measuring means and for judging, in accordance with the focal distance of the zoom lens corresponding to said shorter distance and a depth of field at the corresponding focal distance, whether or not said measured distances of the other points are present within said field of depth and for outputting a judgement signal indicative thereof, determining means for determining a zoom ratio in accordance with a selected program of said data tables based on said shorter distance, said size of the subject and said judgement signal, and output means for driving said zoom lens drive means in accordance with said determined zoom ratio.

2. An apparatus for automatically changing a magnification of a zoom lens of a camera wherein a focal distance of the zoom lens is automatically changed in accordance with a subject of photography, comprising:

exposure program switching means for switching an exposure program between a standard program and an active program in which a shutter speed is set higher than that set in said standard program, said exposure program determining a value of an aperture and said shutter speed in a prescribed relation in accordance with a brightness of external light;

zoom lens drive means for changing the focal distance of the zoom lens;

distance measuring means for measuring a distance of the subject at each of a least three points disposed respectively at a central portion, a right side portion, and a left side portion of the subject within an angle of photographing view; and a controller for controlling said zoom lens drive means in accordance with an output of said distance measuring means, said controller consisting of a first data table in which a plurality of programs for determining the focal distance of the zoom lens in accordance with distance of the subject are set in accordance with a size of the subject within said angle of photographing view, and a second data table in which based on said plurality of programs set in said first data table, focal distances of said programs are set toward a telephotographic side, focal distance determining and program selecting means for receiving a signal indicative of a switching condition of said exposure program switching means and for selecting said first data table when a selected exposure program is said standard program and for selecting said second data table when said selected exposure program is said active program, means for judging which of said measured distances is shortest and for determining the corresponding point and measured distance from the distances of said points measured by said distance measuring means and for judging, in accordance with the focal distance of the zoom lens corresponding to said shortest distance and a depth of field at the corresponding focal distance, whether or not said measured distances of the other points are present within said field of depth and for outputting a judgement signal indicative thereof, determining means for determining a zoom ratio in accordance with a selected program of said data tables based on said shortest distance, said size of the subject and said judgement signal, and output means for driving said zoom lens drive means in accordance with said determined zoom ratio.

3. A camera zoom lens automatic magnification adjustment means comprising:

distance measurement means for determining and outputting distance signals indicative of distances of three points of a subject of photography within a range of photographing view;

exposure mode switching means for outputting a mode selection signal indicative of a user selected one of a standard mode, a creative mode in which a value of an aperture of the camera is set greater than that set in said standard mode, and an active mode in which a shutter speed of the camera is set higher than that set in said standard program, to be used during photography;

zoom lens drive means, operatively coupled to the zoom lens, for setting the zoom lens to a desired zoom ratio; and control means, operatively coupled to said distance measurement means, said exposure mode switching means and said zoom lens drive means, for determining from said distance signals corresponding measured distances and which of said three points is closest to the camera, determining whether the other two of said three points are within said range of photographing view at a focal point corresponding to said closest of said three points to determine the size of the subject within said range of photographing view, storing first, second and third data tables corresponding to said standard, creative and active modes respectively, for determining an appropriate zoom ratio of the zoom lens based upon said corresponding measured distances and said size, selecting an appropriate zoom ratio based upon said first, second, and third data tables and said mode selection signal, and directing said zoom lens drive means to set the zoom lens according to said selected appropriate zoom ratio.

4. The camera zoom lens automatic magnification adjustment means of claim 3, said distance measurement means comprising:

three light emitting diodes, implemented consecutively in a row, for emitting light toward the subject;

lighting means, coupled to said control means and said three light emitting diodes, for directing operation of said three light emitting diodes to sequentially emit light toward the subject as per instruction of said control means;

position sensing means for receiving light emitted from said three light emitting diodes and reflected thereto by the subject and for generating output signals representative of received light; and distance signal generating means, coupled to said position sensing means and said control means, for generating said distance signals as m-bit digital signals in accordance with said output signals of said position sensing means.

5. A method of adjusting a camera zoom lens comprising the steps of:

measuring the distances from the camera of three points located on a subject of photography to determine which of the three points is closest to the camera and to determine the size of the subject within the depth of field at a focal length corresponding to the closest of the three points;

selecting for operation, via switch means, one of a standard mode, a creative mode in which corresponding aperture values of the camera are set greater than the standard mode, and an active mode in which corresponding shutter speeds of the camera are set higher than the standard mode;

determining an appropriate zoom ratio of the zoom lens based upon the measured distance of the closest point, the size of the subject within the depth of field and the selected mode of operation; and adjusting the zoom lens, with zoom lens driving means, to a position which corresponds to the appropriate zoom ratio.

6. The method of adjusting a camera zoom lens of claim 5, said step of measuring comprising the steps of:

emitting light sequentially from three light emitting diodes, implemented sequentially in a straight line, toward the subject of photography;

receiving the emitted light, reflected from the subject of photography, in position sensing means to generate distance signals; and determining, in processing means of the camera, the closest of three points and the size of the subject within the depth of field in accordance with the distance signals.

7. The method of adjusting a camera zoom lens of claim 5, further comprising:

storing in a memory of the camera first, second and third data tables corresponding to the standard, creative and active modes, respectively, wherein the appropriate zoom ratio is determined from one of the data tables corresponding to the selected mode of operation according to the measured distance of the closest point and the size of the subject within the depth of field.

8. A method of adjusting a camera zoom lens comprising the steps of:

measuring the distances from the camera of three points located on a subject of photography to determine which of the three points is closest to the camera and to determine the size of the subject within the depth of field at a focal length corresponding to the closest of the three points;

selecting for operation, via switch means, one of a standard mode and a creative mode in which corresponding aperture values of the camera are set greater than the standard mode;

determining an appropriate zoom ratio of the zoom lens based upon the measured distance of the closest point, the size of the subject within the depth of field and the selected mode of operation; and adjusting the zoom lens, with zoom lens driving means, to a position which corresponds to the appropriate zoom ratio.

9. The method of adjusting a camera zoom lens of claim 8, said step of measuring comprising the steps of:

emitting light sequentially from three light emitting diodes, implemented sequentially in a straight line, toward the subject of photography;

receiving the emitted light, reflected from the subject of photography, in position sensing means to generate distance signals; and determining, in processing means of the camera, the closest of the three points and the size of the subject within the depth of field in accordance with the distance signals.

10. The method of adjusting a camera zoom lens of claim 8, further comprising:

storing in a memory of the camera first and second data tables corresponding to the standard and creative modes, respectively, wherein the appropriate zoom ratio is determined from one of the data tables corresponding to the selected mode of operation according to the measured distance of the closest point and the size of the subject within the depth of field.

11. A method of adjusting a camera zoom lens comprising the steps of:

measuring the distances from the camera of three points located on a subject of photography to determine which of the three points is closest to the camera and to determine the size of the subject within the depth of field at a focal length corresponding to the closest of the three points;

selecting for operation, via switch means, one of a standard mode and an active mode in which corresponding shutter speeds of the camera are set higher than the standard mode;

determining an appropriate zoom ratio of the zoom lens based on the measured distance of the closest point, the size of the subject within the depth of field and the selected mode of operation; and adjusting the zoom lens, with zoom lens driving means, to a position which corresponds to the appropriate zoom ratio.

12. The method of adjusting a camera zoom lens of claim 11, said step of measuring comprising the steps of:

emitting light sequentially from three light emitting diodes, implemented sequentially in a straight line, toward the subject of photography;

receiving the emitted light, reflected from the subject of photography, in position sensing means to generate distance signals; and determining, in processing means of the camera, the closest of the three points and the size of the subject within the depth of field in accordance with the distance signals.

13. The method of adjusting a camera zoom lens of claim 11, further comprising:

storing in a memory of the camera first and second data tables corresponding to the standard and active modes, respectively, wherein the appropriate zoom ratio is determined from one of the data tables corresponding to the selected mode of operation according to the measured distance of the closest point and the size of the subject within the depth of field.

14. A camera zoom lens adjusting apparatus comprising:

measuring means for measuring the distances from the camera of three points located on a subject of photography and for outputting distance signals indicative thereof;

exposure setting means for selecting for operation one of a standard mode, a creative mode in which corresponding aperture values of the camera are set greater than said standard mode, and an active mode in which corresponding shutter speeds of the camera are set higher than said standard mode and for outputting a selection mode signal indicative of a selected mode;

control means, coupled to said measuring means and said exposure setting means, for determining, in accordance with said distance signals, which of said three points is closest to said camera and the size of said subject within the depth of field at a focal length corresponding to said closest of said three points, and determining an appropriate zoom ratio of the zoom lens, based upon the measured distance of said closest point, said size of said subject within said depth of field, and said selected mode to output a zoom lens control signal accordingly; and zoom lens drive means, coupled to said control means and the zoom lens, for adjusting the zoom lens to a position corresponding to said appropriate zoom ratio in accordance with said zoom lens control signal.

15. The camera zoom lens adjusting apparatus of claim 14, said measuring means comprising:

light emitting means, coupled to said control means, for emitting light toward said subject of photography; and position sensing means, coupled to said control means, for receiving said emitted light reflected from said subject of photography and for outputting said distance signals, said light emitting means including three light emitting diodes, arranged consecutively in a straight line, which are sequentially activated to generate said emitted light.

16. The camera zoom lens adjusting apparatus of claim 14, said control means storing first, second, and third data tables corresponding to said standard, creative and active modes, respectively, said appropriate zoom ratio is determined from one of said data tables corresponding to said selected mode according to said measured distance of said closest point and said size of said subject within said depth of field.

17. A camera zoom lens adjusting apparatus comprising:

measuring means for measuring the distances from the camera of three points located on a subject of photography and for outputting distance signals indicative thereof;

exposure setting means for selecting for operation one of a standard mode and a creative mode in which corresponding aperture values of the camera are set greater than said standard mode and for outputting a selection mode signal indicative of a selected mode;

control means, coupled to said measuring means and said exposure setting means, for
determining, in accordance with said distance signals, which of said three points is closest to said camera and the size of said subject within the depth of field at a focal length corresponding to said closest of said three points, and
determining an appropriate zoom ratio of the zoom lens, based upon the measured distance of said closest point, said size of said subject within said depth of field, and said selected mode to output a zoom lens control signal accordingly; and zoom lens drive means, coupled to said control means and the zoom lens, for adjusting the zoom lens to a position corresponding to said appropriate zoom ratio in accordance with said zoom lens control signal.

18. The camera zoom lens adjusting apparatus of claim 17, said measuring means comprising:
light emitting means, coupled to said control means, for emitting light toward said subject of photography; and
position sensing means, coupled to said control means, for receiving said emitted light reflected from said subject of photography and for outputting said distance signals,
said light emitting means including three light emitting diodes, arranged consecutively in a straight line, which are sequentially activated to generate said emitted light.

19. The camera zoom lens adjusting apparatus of claim 17,
said control means storing first and second data tables corresponding to said standard and creative modes, respectively,
said appropriate zoom ratio is determined from one of said data tables corresponding to said selected mode according to said measured distance of said closest point and said size of said subject within said depth of field.

20. A camera zoom lens adjusting apparatus comprising:

measuring means for measuring the distances from the camera of three points located on a subject of photography and for outputting distance signals indicative thereof;

exposure setting means for selecting for operation one of a standard mode and an active mode in which corresponding shutter speeds of the camera are set higher than said standard mode and for outputting a selection mode signal indicative of a selected mode;

control means, coupled to said measuring means and said exposure setting means, for
determining, in accordance with said distance signals, which of said three points is closest to said camera and the size of said subject within the depth of field at a focal length corresponding to said closest of said three points, and
determining an appropriate zoom ratio of the zoom lens, based upon the measured distance of said closest point, said size of said subject within said depth of field, and said selected mode to output a zoom lens control signal accordingly; and zoom lens drive means, coupled to said control means and the zoom lens, for adjusting the zoom lens to a position corresponding to said appropriate zoom ratio in accordance with said zoom lens control signal.

21. The camera zoom lens adjusting apparatus of claim 20, said measuring means comprising:
light emitting means, coupled to said control means, for emitting light toward said subject of photography; and
position sensing means, coupled to said control means, for receiving said emitted light reflected from said subject of photography and for outputting said distance signals,
said light emitting means including three light emitting diodes, arranged consecutively in a straight line, which are sequentially activated to generate said emitted light.

22. The camera zoom lens adjusting apparatus of claim 20,
said control means storing first and second data tables corresponding to said standard and active modes, respectively,
said appropriate zoom ratio is determined from one of said data tables corresponding to said selected mode according to said measured distance of said closest point and said size of said subject within said depth of field.

* * * * *